Feb. 17, 1931.  E. L. CHOTT  1,793,276
WEIGHING SCALE
Filed June 1, 1929
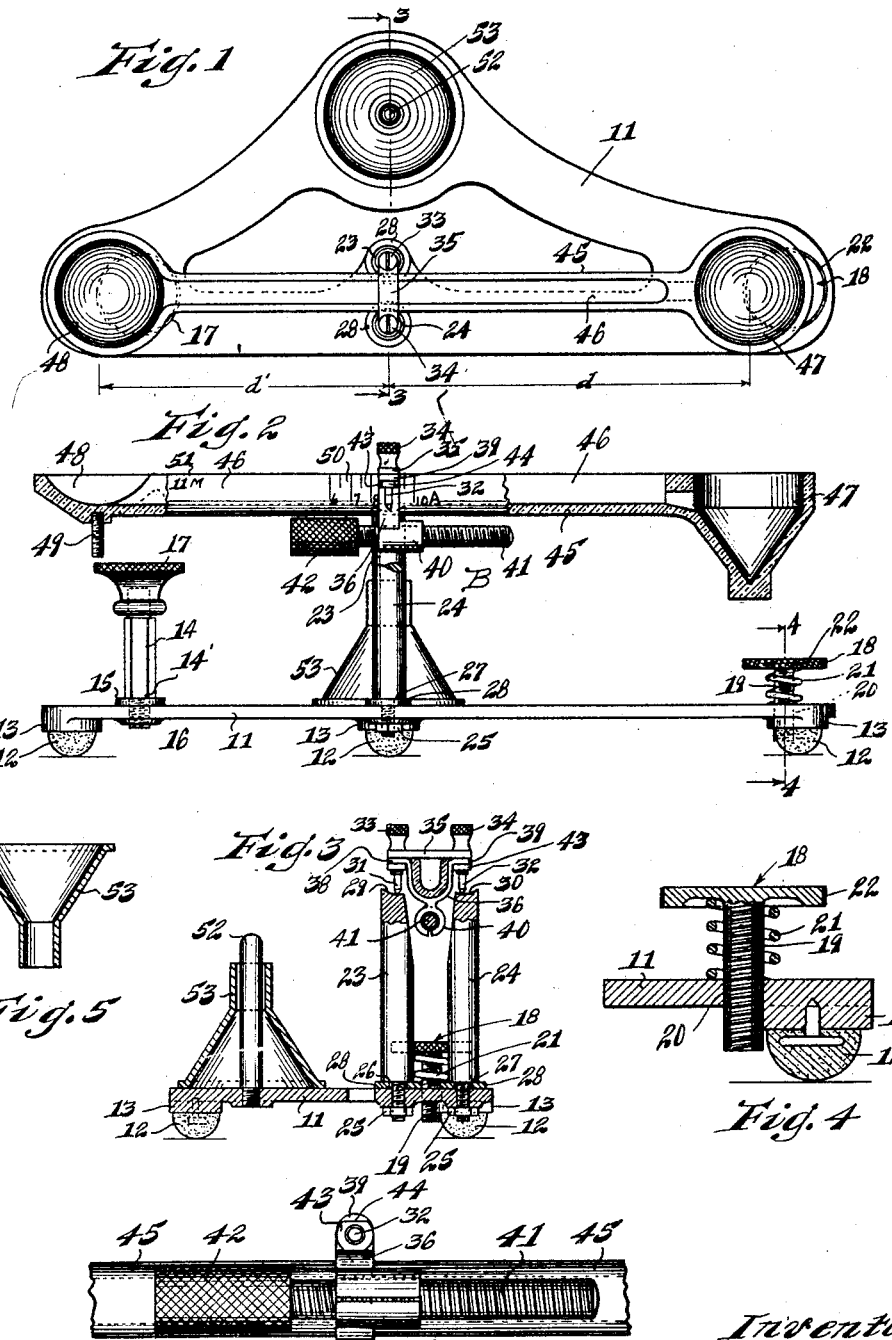
Inventor:
Edward L. Chott,
By Joshua R. H. Potts
his Attorney.

Patented Feb. 17, 1931

1,793,276

UNITED STATES PATENT OFFICE

EDWARD L. CHOTT, OF CHICAGO, ILLINOIS

WEIGHING SCALE

Application filed June 1, 1929. Serial No. 367,707.

My present invention which is an improvement over the device shown in my copending application Serial No. 257,182, filed February 27, 1928, relates in general to weighing scales, and more particularly to a scale providing means for the correct relative proportioning of ingredients employed in producing a given compound or mixture.

The principal object of the present invention is to provide a scale of the kind described whereby the relative proportions of amalgams and chemical mixtures of diverse formulæ may be automatically determined.

Another object of the present invention is to provide an improved scale of the kind indicated for the proportioning of the amalgams used in dental work.

Additional objects and advantages of the method and construction employed will appear more fully in the hereinafter specification when taken in connection with the accompanying drawings, in which, Fig. 1 is a plan view of the device;

Fig. 2 is an elevational view, partly in section, with certain parts broken away.

Fig. 3 is a transverse section taken on lines 3—3 of Fig. 1.

Fig. 4 is a transverse section taken on line 4—4 of Fig. 2.

Fig. 5 is an elevational view of a funnel which may be employed with the device in filling capsules.

Fig. 6 is a fragmentary enlarged bottom plan view of one of the elements connected to the counter-balancing weight.

In the drawings wherein similar characters of reference indicate corresponding parts in the several views, 11 designates a base supported on rubber pads 12 which are secured in lugs 13 formed integrally with the base 11. At one end of the base 11 is a post 14 having a shoulder 14' engaging a washer 15 on the base 11, and a threaded end 16 which serves to secure the post 14 to base 11. To the top of the post 14 a knurled adjusting head 17 is secured, which serves as a means of either removing the post or adjusting it to the desired height as a rest for the end of the scale beam to be hereinafter described. At the other end of the base 11, a second post 18 having a continuously threaded shank 19 is secured in a hole 20 in the base. About the shank 19, a compression spring 21 is coiled, the spring being clampingly compressed between the base 11 and the integrally formed knurled head 22 of post 18, and serving as a means of retaining the head 22 at the height desired as a stop or rest for the other end of the scale beam.

The base 11 is also provided with a pair of upwardly projecting standards 23, 24, which are threaded in the base and secured thereto by nuts 25, it being observed that these standards have a shouldered portion 26, 27 between which and the upper surface of the base 11, washers 28 are clampingly secured. As best shown in Figure 3, it will be observed that the upper extremities of the posts 23, 24 are cupped to provide circular recesses 29, 30, in which the scale beam supporting fulcrum pins 31, 32 seat. The fulcrum pins 31, 32 which are formed with knurled adjusting heads 33, 34 are passed through holes in a link 35 which latter serves to retain them in spaced relation and through registering holes in a yoke 36 having laterally projecting lugs 38, 39 and a depending integrally formed horizontally positioned socket which latter consists of a short section of split cylinder 40 in which is threaded the shank 41 of adjusting member B having an enlarged knurled counter-balancing head 42. The shanks of the fulcrum pins 31, 32 as best shown in Fig. 6, are threadedly engaged by nuts 43 having square or rectilinear edges 44 contacting with the periphery of the yoke 36, these edges 44 preventing rotation of the nuts 43 when the fulcrum pins 31, 32 are turned. The counter-balancing element B, it will later be seen, forms an important feature of the present invention.

Clampingly secured between the link 35 and the yoke 36 is the scale beam 45 which may be formed of vulcanized rubber or other suitable material, has a gutter 46 which communicates with a funnel-shaped cup 47 at one end of the beam, and with a comparatively shallow dish 48 at the other end of the beam, the dish 48 being provided with a downwardly projecting pin 49, which is adapted to abut against the head 17 of the post 14, and to serve as a stop for limiting the downward swing of the scale beam 45 at the end to which the dish 48 is attached. The scale beam 45, it will be observed, is provided with a graduated scale 50, and at a point adjacent the dish 48 with a notation 51 which latter is intended to represent the average amount of mercury which is to be placed in the dish 48, which communicates through the gutter 46 with the funnel-shaped cup 47. The base 11 may be further provided with a vertically positioned post 52 as a convenient mount for a small funnel 53 used in filling the capsules with the dental amalgams employed.

The present invention by means of the counter-balancing element B affords a convenient means of adjusting the scale arm 45, this being accomplished by turning the head 42 which results in longitudinally shifting the member B through cylinder 40 and consequently shifting the center of gravity of scale beam 45. By this procedure the position of the head 42 relatively to the fulcrum pins 31, 32 is changed. The operation of the present invention has been in part indicated above, but will now be fully understood from the following description:

The amalgams used in dentistry are generally prepared by the dentist immediately prior to actual use, in order to avoid a premature hardening of the amalgam. The so-called silver amalgams are generally based on a 67% silver alloy which is triturated in a mortar with sufficient mercury to form the well known "silver amalgam" used as a filling for cavities in teeth. The plastic consistency of the freshly mixed silver amalgam is of course dependent upon the relative proportion of mercury to the silver alloy, it being desirable to have an easily moldable paste.

By means of my scale I am now enabled to effect a great convenience in the weighing and mixing of the components of the above referred to amalgams in the following manner:

Upon inspection of Figs. 1, 2 and 3, the length $d$ of the right hand or power arm section of the scale beam 45 from the fulcrum pins 31, 32 will be found greater than the length of the left hand or the weight arm section of $d'$ of the same scale beam, the element B serving to counter-balance the disproportionate sections $d$ and $d'$ of the scale beam, thus producing equilibrium.

It will now be apparent that a given weight of mercury placed in the dish 48 will require a disproportionate smaller weight of silver alloy to be put in the cup 47 in order to counter-balance the scale beam, this being in accordance with the elementary laws of the lever as defined in the equation $Wd = Pd'$, which W is the weight, P the power arm, and $d-d'$ the distances or lengths of the left and right hand sections of the scale beam 45, which in the present instance is the lever arm. It will be observed that when the weighted adjusting head 42 of the member B is turned in order to shift longitudinally, its position transversely of the fulcrum pins 31, 32, a "weight moment" will be imposed on the weight arm section $d'$ of the scale beam 45, requiring a compensating, greater or less weight or material to be placed on the alloy receiving or power arm $d$ of the scale beam 45. It will be evident, therefore, that the necessary ingredients of an indefinite number of alloys and other compounds may be automatically proportioned without the necessity of an individual preliminary weighing.

It will further be obvious that after the scale beam 45 has been preliminarily slid to a position suitable for producing an amalgam of greater or less proportion of mercury or silver alloy, subsequent mixtures of the same formula will be automatically arrived at by merely pouring in the ingredients into their respective receptacles, the dish 48 and cup 47 until the scale beam 43 swings into equilibrium.

Heretofore after the preliminary weighing of the ingredients, it was necessary to pour same into a separate vessel preparatory to trituration. The gutter 46 now permits the direct transfer of the mercury in dish 48 into the cup 47 containing the silver alloy. The entire contents of cup 47 may now be worked into the usual amalgam paste, after dumping into a mortar.

While I have described my invention particularly with regard to the preparation of dental amalgams, I have found the device to be equally convenient when used for the mixing of paints, chemicals, food products, etc., and in fact wherever a mixture of definite given proportions is desired. The same method, as set forth above, will govern the preparation of these indicated mixtures by my scale, automatic proportioning of the components being obtained as set forth above.

It will be apparent that my device is susceptible to considerable variation and modification; hence, I do not confine myself to the precise details as set forth but wish to avail myself of such variations and modifications as fall within the scope of the appended claims.

What I claim as new and desire to secure by Letters Patent is:

1. A scale of the kind described, comprising a fulcrum support, a scale beam adjustably supported on said fulcrum support, a container at each end of said scale beam, and means connected to and longitudinally adjustable on said scale beam for shifting the center of gravity of said scale beam.

2. A scale of the kind described, comprising a scale beam slidably and adjustably supported on a standard, a gutter formed in said arm providing a means for transposing ingredients from one container to another, and an adjusting weight secured to said scale beam for shifting the center of gravity of the scale beam relatively to said fulcrum, whereby means are provided to autotmatically proportion ingredients for the production of a given mixture.

3. A scale of the kind described, comprising a scale beam, a pair of containers fastened at opposite ends of said beam, a longitudinal passage-way provided in the beam and connecting said containers, a weight adjustably secured to the beam, a pair of fulcrum pins clampingly engaged with said beam, a support for said fulcrum pins, said weight being adjustable transversely of said fulcrum pins for shifting the center of gravity of said scale beam.

4. A scale of the kind described, comprising a scale beam slidably and adjustably supported on a pair of standards serving as a fulcrum, a container fastened to opposite ends of said scale beam, a gutter provided in the scale beam and connecting one container to the other, and a weight adjustably secured to the scale beam, said weight being longitudinally adjustable relative to said beam, whereby the center of gravity of said scale beam may be shifted for the purpose of automatically determining the relative proportions of ingredients necessary to a given mixture.

5. A scale of the kind described, comprising a scale beam, a yoke slidably adjustable on said scale beam, said yoke having a socket element fastened thereto, a member longitudinally adjustable in said socket element, and means forming a part of said scale for checking undue swinging motion of said scale beam.

6. A scale of the kind described, comprising a base, a pair of standards mounted on said base, a pair of fulcrum pins supported on said pair of standards, a yoke connected to said fulcrum pins and clampingly engaged with a scale beam having a pair of containers at opposite ends thereof, said containers being joined by a communicating gutter shaped in said scale beam, and a rotatably mounted counter-balancing member adjustably secured to said 2 yoke, said counter-balancing member serving to shift the center of gravity of said scale beam relatively to said pair of standards.

In testimony whereof I have signed my name to this specification.

EDWARD L. CHOTT.